United States Patent [19]

Mayumi et al.

[11] 4,364,894
[45] Dec. 21, 1982

[54] METHOD FOR MOLDING A REINFORCED PLASTIC TUBULAR BODY HAVING A SOCKET, AND MOLD THEREFORE

[75] Inventors: Masakatsu Mayumi, Osaka; Takeshi Okuyama, Kyoto; Kenji Mitooka, Okayama, all of Japan

[73] Assignee: Sekisui Kagaku Kogyo Kabushiki Kaisha, Osaka, Japan

[21] Appl. No.: 254,663

[22] Filed: Apr. 16, 1981

[30] Foreign Application Priority Data

Apr. 21, 1980 [JP] Japan ............................... 55/53383
Apr. 21, 1980 [JP] Japan ........................... 55/55090[U]

[51] Int. Cl.³ ..................... B29D 3/02; B29D 23/00; B29C 1/00
[52] U.S. Cl. ................................... 264/334; 156/173; 156/242; 156/425; 156/446; 264/137; 264/257; 425/182; 425/186; 425/441; 425/471
[58] Field of Search ............... 425/435, 436, 438, 471, 425/175, 182, 186, 383, 441, 461; 156/173, 175, 425, 428, 429–431, 433, 446, 447, 457, 449, 242, 450; 249/175; 264/219, 257, 258, 310, 320, 322, 334, 336, 137

[56] References Cited

U.S. PATENT DOCUMENTS

| | | | |
|---|---|---|---|
| 3,616,063 | 10/1971 | Bradley | 156/429 |
| 3,775,207 | 11/1973 | Harmon | 156/173 |
| 4,134,949 | 1/1979 | McGregor | 264/334 |
| 4,319,950 | 3/1982 | Snopek et al. | 156/446 |

FOREIGN PATENT DOCUMENTS 47-100863 2/1972 Japan.
52-123464 10/1977 Japan.

Primary Examiner—Willard E. Hoag
Attorney, Agent, or Firm—Wenderoth, Lind & Ponack

[57] ABSTRACT

Apparatus and method for molding a reinforced plastic tubular body having a socket, and a mold for carrying out the method. The steps of the method are
 assembling a main mold body having a tubular section and a socket-molding member slidable axially along the periphery of the tubular section of the main body and fixable at a predetermined position to the tubular section of the main body to form a mold by fixing the socket-molding member at the predetermined position to the tubular section of the main body,
 forming a layer of a reinforced plastic molding material around the resulting mold and curing it, and
 pulling the main mold body and the socket-molding member axially from the cured plastic layer.

The mold is constituted by a main body having a tubular section and a socket-molding member axially slidable along the periphery of the tubular section of the main body and fixable at a predetermined position to the tubular section of the main body, the constituent parts of the mold being assembled by fixing the socket-molding member to the tubular member of the main body at the predetermined position.

8 Claims, 10 Drawing Figures

Fig. 8

METHOD FOR MOLDING A REINFORCED PLASTIC TUBULAR BODY HAVING A SOCKET, AND MOLD THEREFORE

This invention relates to a method for molding a socket-type reinforced plastic tubular body, such as a pipe coupling, and to a mold therefor.

The term "reinforced plastic tubular body", as used herein, denotes a tubular article molded from a molding material comprising a synthetic resin, for example a thermosetting resin such as an unsaturated polyester, and a reinforcing material such as glass fibers.

In the production of socket-type reinforced plastic tubular bodies, it has been the practice to perform molding in a mold which is built by providing two stepped hollow cylindrical members consisting of a large-diameter section and a small-diameter section and having an equal outside diameter at the large-diameter sections, joining the end surface of the small-diameter section of one of the hollow cylindrical members and the end surface of the large-diameter section of the other hollow cylindrical member concentrically and splittably to form a mold member for molding a coupling section, and splittably joining a plurality of such mold members for molding a coupling section at the end surfaces of their small-diameter cylindrical sections either directly or through an intermediate mold member (e.g., Japanese Laid-Open Utility Model Publication No. 100863/1973), or to perform molding using a core formed by detachably joining at least two mold members (e.g., Japanese Laid-Open Patent Publication No. 123464/1977). However, these molding devices are not constructed such that pipe couplings of different shapes or different sizes can be molded by a single molding device. Accordingly, these prior techiques have the defect that separate molds must be provided for molding socket type reinforced plastic tubular bodies of different shapes or sizes and the cost of production becomes enormous. Moreover, a great force is required to pull out a mold after a reinforced plastic molding material composed of a resin and a reinforcing material is wound around the mold and then cured into a molded article. Thus, the conventional techiques have the defect that large-scale equipment using a hydraulic jack, etc. is required, and the operation is troublesome and complex.

It is an object of this invention to remove the aforesaid defects, and to provide a method for molding tubular bodies, such as a pipe coupling, of various shapes or sizes using a single mold, and to provide a mold used therefor.

Another object of this invention is to provide a mold which can be easily pulled out from a molded tubular body after molding the tubular body composed of a reinforced plastic molding material around the mold.

The present invention provides a method for molding a socket-type reinforced plastic tubular body, which comprises assembling a main mold body having a tubular section and a socket-molding member slidable axially along the periphery of the tubular section of the main body and fixable at a predetermined position to the tubular section of the main body to form a mold by fixing the socket-molding member at said predetermined position to the tubular section of the main body, forming a layer of a reinforced plastic molding material around the resulting mold and curing it, and thereafter pulling out the main mold body and the socket-molding member axially from the cured plastic layer.

According to a preferred embodiment of the invention, an axially slidable annular member is provided on the periphery of socket-molding member and the main body of the mold and the socket-molding member are simultaneously pulled out from the cured resin layer by pushing the socket-molding member connected to the main mold member against the annular member.

According to another preferred embodiment of the method of this invention, the main body of the mold is pulled out from the cured plastic layer by pushing the main body of the mold against the socket-molding member thereby slidably moving the main body and the socket-molding member relative to each other.

According to still another preferred embodiment of the method of this invention, an axially slidable annular member is provided about the periphery of the socket-molding member, and the pulling out of the socket-molding member from the cured plastic layer is effected by pushing the socket-molding member against the annular member thereby slidably moving the socket-molding member and the annular member relative to each other.

In another aspect, the present invention provides a mold for molding a socket-type reinforced plastic tubular body, said mold comprising a main body having a tubular section and a socket-molding member axially slidable along the periphery of the tubular section of the main body and fixable at a predetermined position to the tubular section of the main body, said constituent parts of the mold being assembled by fixing the socket-molding member to the tubular member of the main body at said predetermined position.

In still another aspect, the present invention provides a mold for molding a socket-type reinforced plastic tubular body, said mold comprising (1) a main body including a tubular section and at each end portion of the tubular section, a protruding portion extending radially outwardly of the tubular section and having a plurality of threaded holes and (2) a socket-molding member slidable axially of the tubular section of the main body and having female threaded portions for threadably receiving positioning bolts extending through said threaded holes for fixing said socket-molding member at a predetermined position to the tubular section of the main body, and said socket-molding member and said main body being adapted to be moved away from each other by inserting threaded jack bolts into the threaded holes, causing the leading ends of the jack bolts to abut the socket-molding member and advancing the jack bolts further so as to push the socket-molding member.

In yet another aspect, the present invention provides a mold for molding a socket-type reinforced plastic tubular body, said mold comprising a main body having a tubular section and a socket-molding member axially slidably mounted on the periphery of the tubular section of the main body, said socket-molding member including a short cylindrical section and a protruding portion having a plurality of threaded holes and protruding at each end portion of the short cylindrical section radially outwardly of the tubular section of the main body, said socket-molding member further having an annular member axially slidably mounted on the periphery of the short cylindrical section, said annular member having female threaded portions for threadably receiving positioning bolts extending through the holes of the socket-molding member, said annular member being fixed to the short cylindrical section of the socket-molding member by screwing positioning bolts through the holes into the female threaded portions of the annular member and fixing the positioning bolts to said protruding portion at the positions of the threaded holes, and said annular member and said socket-molding member being adapted to be moved away from each other by inserting threaded jack bolts into the threaded holes, causing the leading ends of the jack bolts to abut the annular member and further advancing the jack bolts so as to push the annular member.

Specific embodiments of the invention are described below with reference to the accompanying drawings in which.

Figure 1:
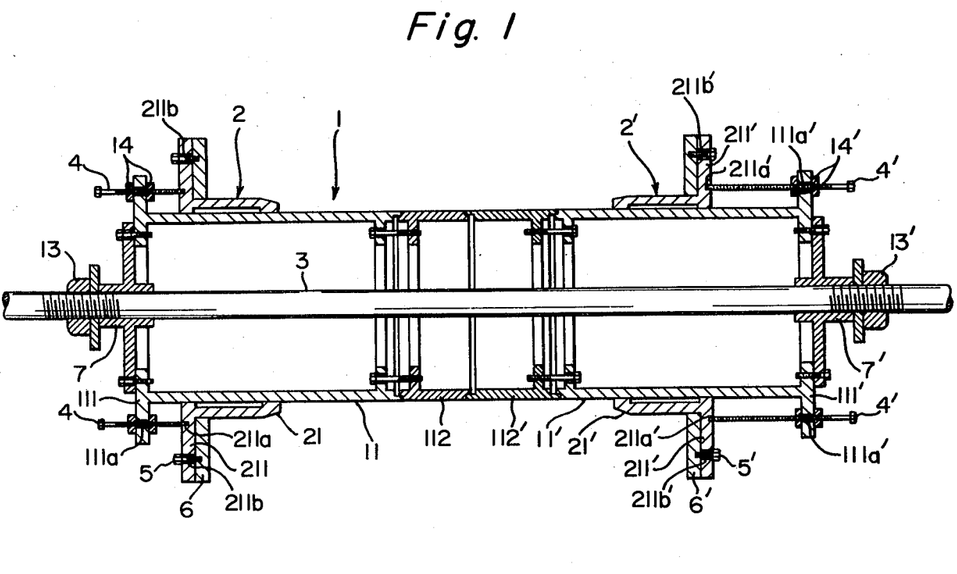
FIG. 1 is a sectional view of a mold for molding a socket-type pipe coupling in accordance with one embodiment of the present invention.
Figure 2:
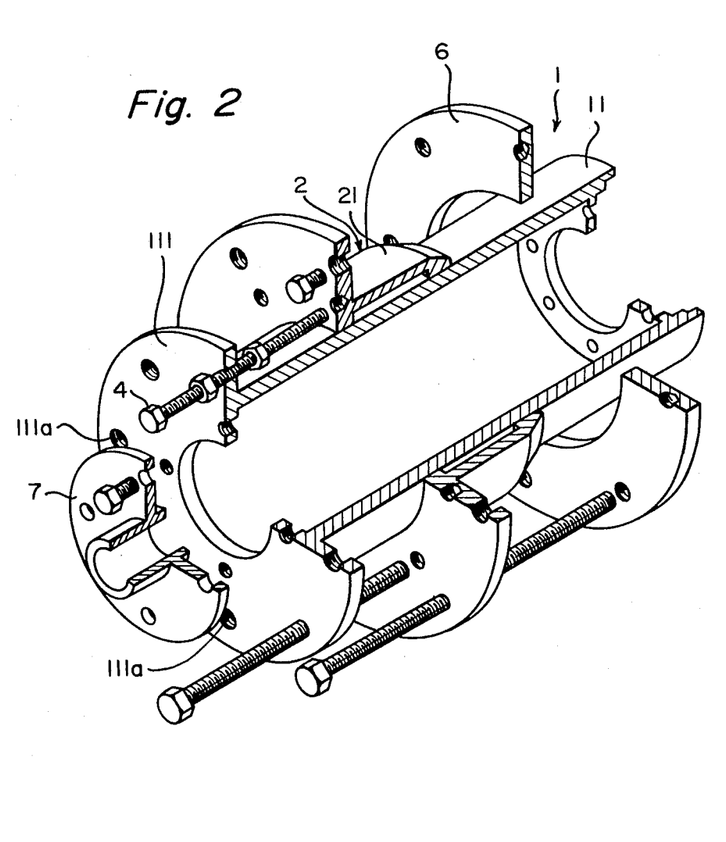
FIG. 2 is a partly broken-away perspective view showing a part of the mold of FIG. 1 on an enlarged scale.

Referring to FIGS. 1 and 2, the reference numeral 1 designates the main body of a mold which consists of a pair of tubular members 11 and 11' having a portion with substantially the same outside diameter as the inside diameter of a central portion of a socket-type reinforced plastic tubular body to be molded and annular flange portions 111 and 111' protruding radially from the respective outer ends of the tubular members 11 and 11'. To each of the axially inner ends of the tubular members 11 and 11' is connected one end each of short tubular members 112 and 112', with the other ends of the short tubular members 112 and 112' being in abutment with each other. A plurality of threaded holes 111a and 111a' are provided in flange portions 111 and 111' respectively, and long positioning bolts 4 and 4' are inserted loosely through the holes 11a and 11a' and can be fixed to the flange portions 111 and 111' by means of nuts 14 on both sides of the flanges 111 and 111' respectively.

The reference numerals 2 and 2' designate socket-molding members consisting respectively of relatively short cylindrical members 21 and 21' and flange portions 211 and 211' provided at one end each of the cylindrical members 21 and 21'. Each short cylindrical member 21 or 21' has a configuration conforming to the inner surface shape of a socket of a reinforced plastic tubular body to be molded, and the minimum inside diameter of each of the short cylindrical members 21 and 21' and the flange portions 211 and 211' is made substantially equal to the outside diameter of the tubular members 11 and 11'. The flange portions 211 and 211' have provided therein threaded holes 211b and 211b', and female threaded portions 211a and 211a' which threadably receive the ends of the long positioning bolts 4 and 4' inserted through the holes 111a and 111a' of the main body 1. Into the theaded holes 211b and 211b' are loosely inserted short bolts 5 and 5'. Annular plates 6 and 6' which are slidable along the periphery of the cylindrical members 21 and 21' can be fixed to the axial inside surfaces of the flanges 211 and 211' by means of the bolts 5 and 5'.

The reference numeral 3 designates a shaft having a male screw portion provided on its peripheral surface at a position near each end thereof.

The reference numerals 7 and 7' designate coupling members each consisting of a short tubular portion and a flange portion. The shaft 3 is inserted into the short tubular portions and fixed to the flanges 111 and 111' of the main body 1 by the flange portions.

In assembling a mold for socket-type pipe couplings, the socket-molding members 2 and 2' having fixed thereto the annular plates 6 and 6' are axially slidably mounted on the tubular members 11 and 11' of the main body 1, and then the ends of the short tubular members 112 and 112' are caused to abut each other. Then, the main body 1 is fixed to the shaft 3 by means of nuts 13 and 13' through the coupling members 7 and 7'. Thereafter, the long positioning bolts 4 and 4' are threaded into the female threaded portions 211a and 211a' of the socket-molding member 2 and 2', and fixed at suitable positions to the flange portions 111 and 111' by means of nuts 14 and 14' on both sides each of the flanges 111 and 111', thus fixing the socket-molding members 2 and 2' to the main body 1 at predetermined positions. Thus, a mold for socket-type pipe couplings is formed.

Figure 3:
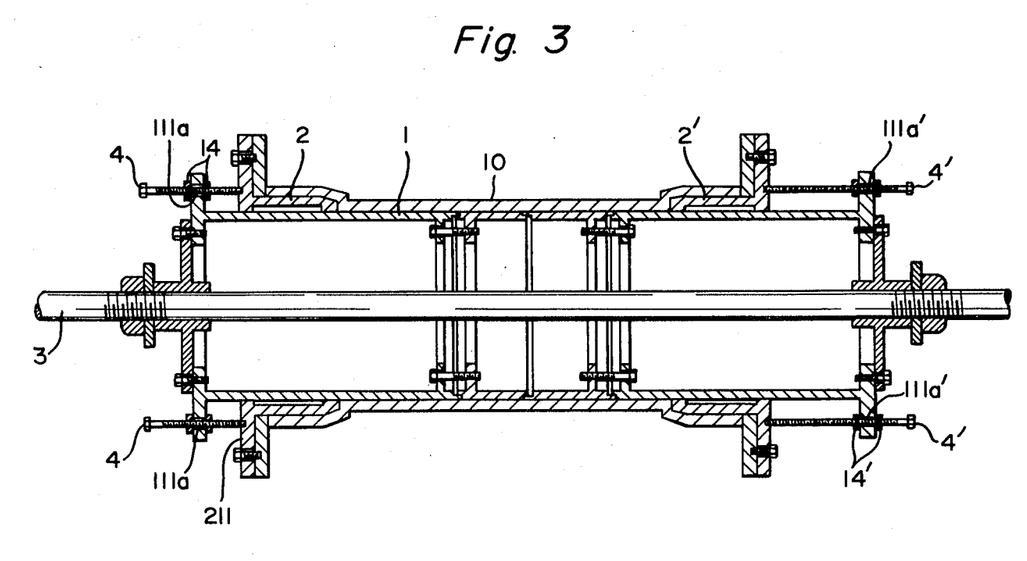
FIG. 3 is a sectional view showing the mold of FIG. 1 being used for molding a socket-type pipe coupling.
Figure 4:
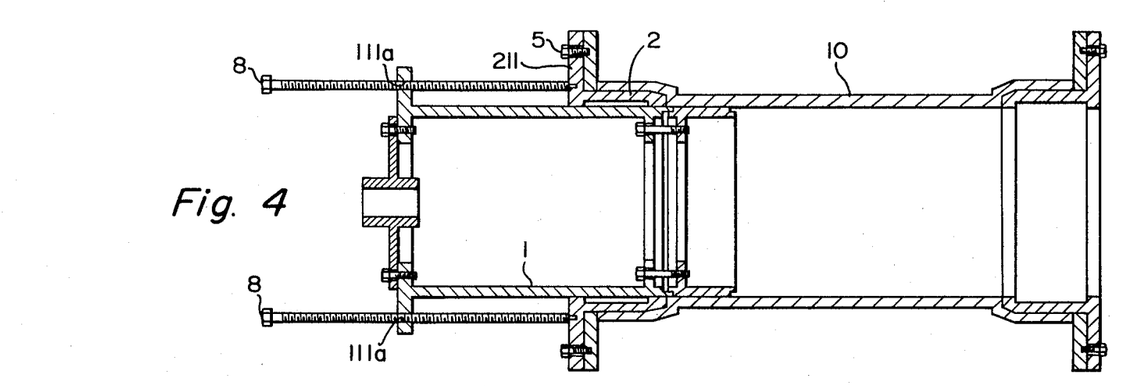
FIG. 4 is a sectional view showing a method for pulling the main body of the mold out of the pipe coupling after production of a pipe coupling.
Figure 5:
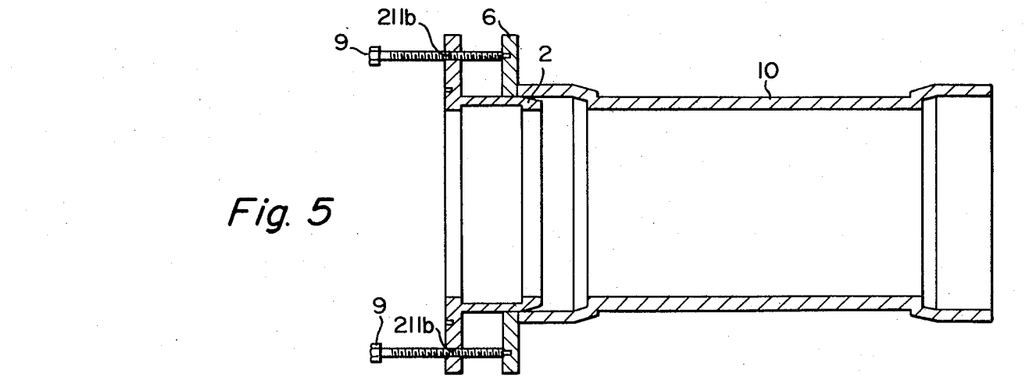
FIG. 5 is a sectional view showing a method for pulling the socket-molding member of the mold out of the pipe coupling after production of the pipe coupling.

FIGS. 3 to 5 are sectional views for illustrating a method for molding a socket-type pipe coupling in accordance with one embodiment of the invention using the mold shown in FIGS. 1 and 2.

As shown in FIG. 3, a reinforced plastic molding material obtained by impregnating an unsaturated polyester resin in a reinforcing material such as a glass roving is wound around the main body 1 and the socket-molding members 2 and 2' of the mold assembled as above to form a reinforced plastic molding material layer 10. The layer 10 is then cured.

Then, the nuts 13 and 13' threadably mounted the shaft 3 are removed and the shaft 3 is pulled out. Furthermore, the long positioning bolts 4 are pulled out after removing the nuts 14 and 14'. In place of them, long bolts 8 are threadably fitted into the screw holes 11a, and their leading ends are caused to abut against the flange portion 211 of the socket-molding member 2. Then, the jack bolts 8 are further screwed into the holes 111a to move the main body 1 away from the socket-molding member 2. Thus, the main body 1 is pulled out from the inside surface of the reinforced plastic molding material layer 10. (See FIG. 4.)

Thereafter, the short bolts 5 are pulled out, and long jack bolts 9 are threadably fitted into female threads provided in the holes 211b, and their leading ends are caused to abut the annular plate 6. The jack bolts 9 are then further screwed into the holes 211b to move the socket-molding member 2 away from the annular plate 6. Thus, the socket-molding member 2 is pulled out from the inside surface of the socket portion of the reinforced plastic molding material layer 10 (see FIG.

3). As a result, molding of a socket-type pipe coupling is completed.

Figure 6:
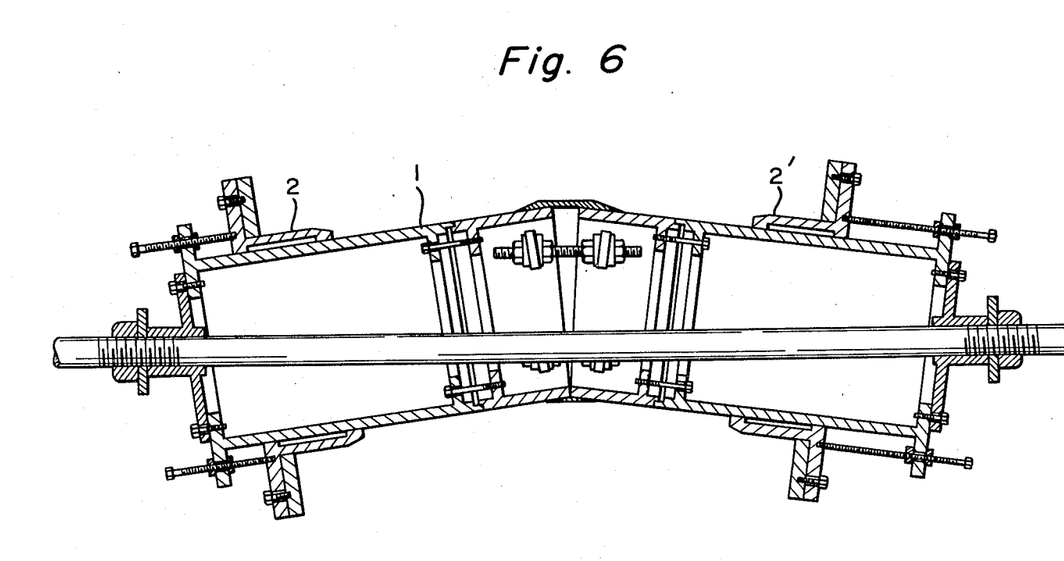
FIG. 6 is a sectional view showing a mold for producing an elbow-type pipe coupling in accordance with another embodiment of the invention.
Figure 7:
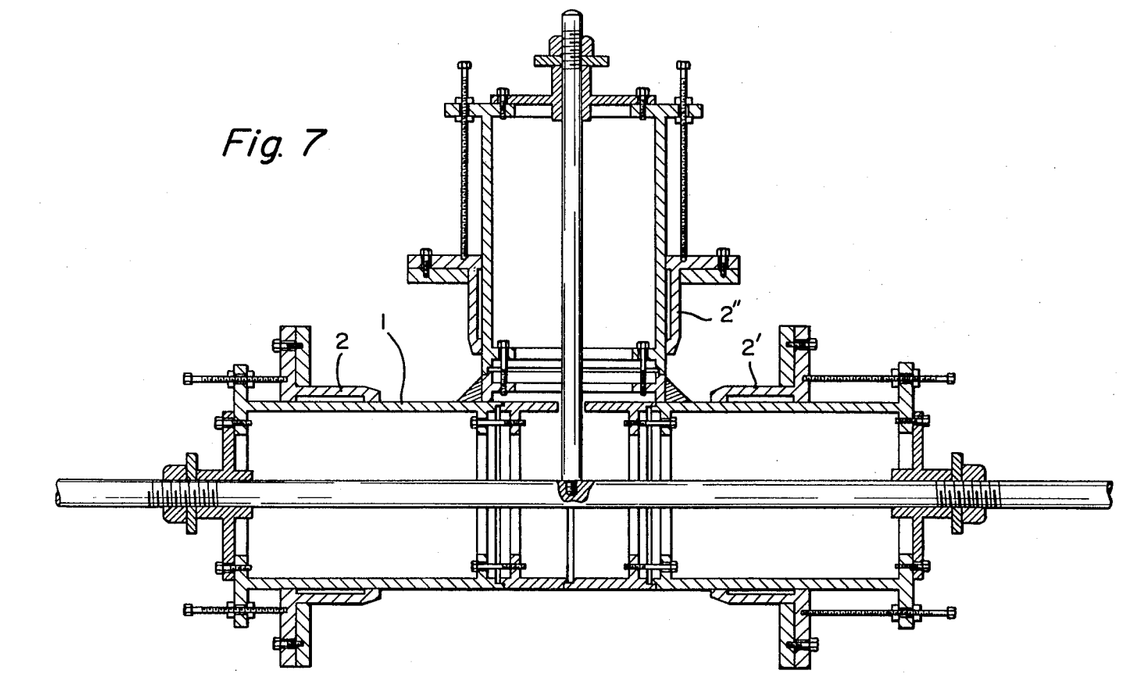
FIG. 7 is a sectional view showing a mold for production of a cheese-type pipe coupling in accordance with still another embodiment of the invention.

By using the mold shown in FIG. 6 and the mold shown in FIG. 7, an elbow-type pipe coupling and a cheese-type pipe coupling can respectively be formed by providing socket-forming molds 2,2', or 2,2',2" at predetermined positions of the main body 1 of the mold.

As described hereinabove, by adjusting the minimum inside diameter of the cylindrical members 21 and 21' and the flange portions 211 and 211' of the socket-molding portions 2 and 2' to substantially the same value as the outside diameters of the tubular members 11 and 11' of the main body 1, the socket-molding members 2 and 2' can be easily caused to slide axially outwardly of the main body 1 and can be fixed at a predetermined position.

Furthermore, by pushing on the main body 1 with a force which reacts against the socket-molding member 2, the main body 1 can be easily pulled out.

Figure 8:
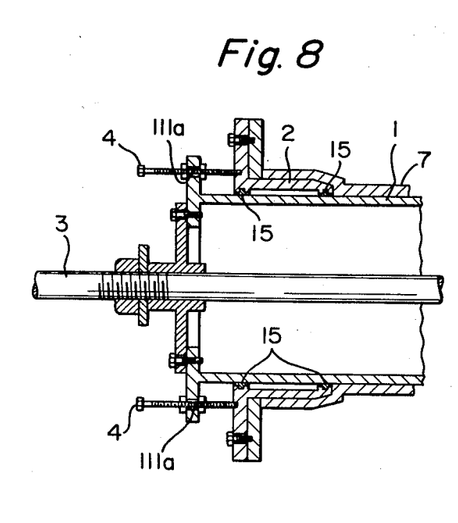
FIG. 8 is a partial sectional view showing yet another embodiment of the invention.
Figure 9:
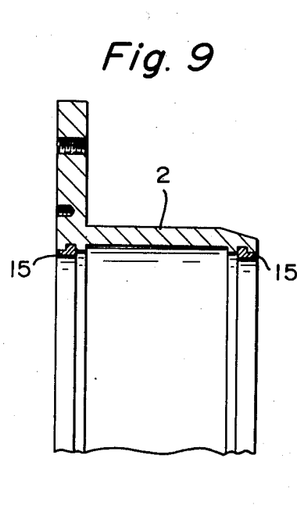
FIGS. 9 and 10 are partial sectional views showing on an enlarged scale details of the socket-molding member shown in FIG. 8.
Figure 10:
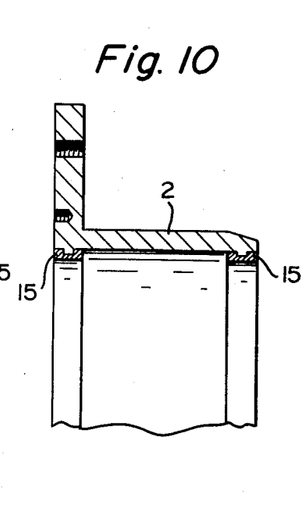

As shown in FIG. 8, a cushioning member 15 may be provided at that part of the socket-molding member 2 which makes contact with the outside surface of the tubular member 11 of the main body 1. Provision of the cushioning member 15 serves to prevent the surface of the tubular member 11 from being injured by the sliding of the tubular member 11, and also to prevent resin from flowing into the gap between the tubular member 11 and the socket-molding member 2 during the molding process.

The cushioning member may be made of a material having a lower hardness from the material which constitutes the mold. For example, if the mold is made of a steel material, the cushioning member may be composed of a less hard metal such as copper, an elastomeric material (such as rubber), wood, plastics, etc.

A cushioning member which is used at a point which may possibly make contact with the thermosetting resin used as a material for the reinforced plastic pipes during molding should not be adhesive to the such a resin, nor impair curing of the resin, nor undergo a corrosive attack by the resin. For this purpose, silicone rubbers, Teflon, etc. are suitable for the cushioning member.

It is necessary that the cushioning member should not be removed when the socket-molding member slides over the main body of the mold. Thus, the cushioning member may be fixed, for example, by providing a raised or depressed portion in that part of the socket-molding member 2 to which is fixed the cushioning member 15, and fitting a cushioning member 15 having a depressed or raised portion having a corresponding configuration to the raised or depressed portion of the socket-molding member 2 into the raised or depressed portion. Preferably, cushioning members of a relatively soft material are used at the end portions of the socket-molding member, which may possibly contact the resin during molding, so as not to permit intrusion of the resin, and a hard cushioning material is used at the other portions. In this way, the intrusion of the resin is prevented by the soft material and injuring of the surface of the main body of the mold is prevented by the hard material. At the same time, this serves to effect centering of the main body and the socket-molding member.

In the specific embodiments described hereinabove with regard to FIGS. 1 to 5, in fixing the socket-molding member 2 at a predetermined position on the main body 1, elongated positioning bolts 4 freely passable through the screw holes 11a are used and fixed by means of nuts 14, and in pushing the main body 1 against the socket-molding member 2, the elongated bolts 4 are pulled out and instead, thicker bolts 8 having a male threaded portion threadable into the holes 11a are used. In an alternative embodiment, separate threaded holes 111a may be used for the positioning bolts 4 and the jack bolts 8, and this permits omission of a step of pulling out the elongated bolts 4. Or it is possible to use a method which comprises using a thick jack bolt 8 having a male thread threaded into the threaded holes 111a, fixing the stock-molding member by fixing the jack bolts 8 by means of nuts 14, and when the main body is to be pushed with a force which reacts against the socket-molding member, removing the nuts 14, and threading the jack bolt 8 into the threaded hole 111a. The same can be said with reference to the holding bolts 5 and jack bolts 9 FIG. 5, an the jack bolts 9 which are threadably received in the threaded holes 111b at the start of the method can be used.

In the above embodiment, the portion protruding radially and outwardly from the main body 1 and the portion protruding outwardly from the socket-molding member 2 are both annular flanges. But they need not necessarily be annular. Instead, the projecting portions may, for example, be composed of a plurality of radially extending pieces. From the standpoint of strength, however, annular flanges are desirable.

In the embodiments described hereinabove with reference to FIGS. 4 and 5, the mold is pulled out from the molded plastic tube by first pulling out the main body and then the socket-molding member. It is possible to perform the pulling out of the main body and the socket-molding member simultaneously by pushing the socket-molding member connected to the main mold member with a force which reacts against the annular member.

According to the method of this invention, a socket-type reinforced plastic tubular body is produced by using a mold obtained by assembling a main body and socket-molding members axially slidable on and fixable to the outside surface of the main body. Accordingly, by providing socket-molding members of different configurations and sizes and using them exchangeably according to the configuration and size of the desired molded article, tubular bodies having sockets of different configurations and sizes can be molded as required. Furthermore, by adjusting the position at which the socket-molding member is fixed to the main body of the mold, tubular bodies having a tubular section of different lengths can be produced by using one type of mold.

Removal of the mold from the resulting tubular body after molding is effected by pushing the socket-molding member connected to the main mold member with a force which reacts against the annular member, or by pushing the main body of the mold against the socket-molding member, or the socket-molding member against the annular member. Pushing can be accomplished by a simple operation of screwing a bolt into a threaded hole. Thus, no large-sized device is required, and the process is economical.

The provision of a cushioning member at that inner circumferential part of the socket-molding member which contacts the main body of the mold serves to prevent the surface of the tubular section of the main body from being injured, and also to prevent resin from flowing into the gap between the main body of the mold and the socket-molding member during the molding operation.

What we claim is:

1. A method for molding a socket-type plastic tubular body, comprising:

placing an annular member on the periphery of a cylindrical section of a socket molding member and sliding it axially along the cylindrical section to a predetermined position where one side of the annular member will be contacted by plastic of which the tubular body is to be molded during the molding, and fixing said annular member at said predetermined position;

placing said socket-molding member on the periphery of a tubular section of a main mold body and sliding it axially along the tubular portion to a further predetermined position and fixing it to the tubular section at said further predetermined position for forming a mold;

forming a layer of plastic molding material around the thus formed mold and curing it; and pushing on said socket-molding member in a direction form moving said socket-molding member and said main mold body out of the thus molded layer of plastic molding material and with a force which reacts on said annular member for pulling the socket-molding member and the main mold body out of the thus molded layer of plastic.

2. A method for molding a socket-type plastic tubular body, comprising:

placing an annular member on the periphery of a cylindrical section of the socket molding member and sliding it axially along the cylindrical section to a further predetermined position where one side of the annular member will be contacted by plastic of which the tubular body is to be molded during the molding, and fixing said annular member at said predetermined position;

placing a socket-molding member on the periphery of a tubular section of a main mold body and sliding it axially along the tubular section at said predetermined position for forming a mold;

forming a layer of plastic molding material around the thus formed mold and curing it;

pushing on said main mold body in a direction for moving said main mold body axially out of the thus molded layer of plastic molding material with a force which reacts on said socket-molding member for pulling the main mold body out of the thus molded layer of plastic; and pushing on said socket-molding member in a direction for moving said socket-molding member out of the thus molded layer of plastic molding material with a force which reacts on said annular member for pulling the socket-molding member out of the thus molded layer of plastic.

3. A mold for molding a socket-type plastic tubular body, comprising:

a main body having a tubular section;

a socket-molding member axially slidably mounted on said tubular section;

means for fixing said socket molding member at a predetermined position on said tubular section; and at least one cushioning member on the inside circumferential surface of said socket-molding member in sliding contact with the outside surface of said tubular section for preventing injury to said tubular section and preventing plastic from flowing between said tubular section and said socket-molding member during molding of the plastic on said mold.

4. A mold for molding a socket-type plastic tubular body, said mold comprising:

a main body having a tubular section and a radially protuding portion at one end thereof having a plurality of threaded holes therein;

a socket-molding member axially slidably mounted on said tubular section and having female threaded recesses therein;

positioning bolts extending through said threaded holes in said protuding portion and threadedly engaged in said recesses;

means for fixing said positioning bolts relative to said protruding portion for fixing said socket-molding member at a predetermined position along said tubular section relative to said main body; and 'jack bolts threadably mountable through said threaded holes in said protruding portion with the forward ends of said jack bolts abutting said socket-molding member for, when said jack bolts are threaded toward said socket-molding member from said protruding portion, separating said main body from said socket-molding member and pulling said main body from said socket-molding member and pulling said main body out of a plastic tubular body which has been molded around said mold.

5. A mold as claimed in claim 4 in which said socket-molding member has a cylindrical portion and a radially protruding portion protruding therefrom and having a plurality of threaded holes therein, and said mold further comprises an annular member axially slidably mounted on said cylindrical portion and on the opposite side of said radially protruding portion of said socket-molding member from the radially protruding portion of said main body, further positioning bolts extending through said threaded holes in said protruding portion of said socket-molding member and engaged with said annular member, means for fixing said further positioning bolts relative to said protruding portion of said socket-molding member for fixing said annular member in position along said cylindrical portion, and further jack bolts threadably mountable through said threaded holes in said protruding portion of said socket-molding member with the forward ends of said further jack bolts abutting said annular member for, when said further jack bolts are threaded toward said annular member from said socket-molding member, separating said socket-molding member from said annular member and pulling said socket-molding member out of a plastic tubular body which has been molded around said mold.

6. A mold for molding a socket-type plastic tubular body, said mold comprising:

a main body having a tubular section and a radially protruding portion at one end thereof having a plurality of threaded holes therein;

a socket-molding member axially slidably mounted on said tubular section and having female threaded recesses therein;

positioning bolts threaded through some of said threaded holes and threadedly engaged in said recesses for fixing said socket-molding member at a predetermined position along said tubular section relative to said main body; and jack bolts theaded through the remainder of said threaded holes in said protruding portion with the forward ends of said jack bolts abutting said socket-molding member for, when said positioning bolts have been disengaged from said threaded recesses and said jack bolts are threaded toward said socket-molding member from said protruding portion, separating said main body from said socket-molding member and pulling said main body out of a plastic tubular body which has been molded around said mold.

7. A mold as claimed in claim 6 in which said socket-molding member has a cylindrical portion and a radially protruding portion protruding therefrom and having a plurality of threaded holes therein, and said mold further comprises an annular member axially slidably mounted on said cylindrical portion and on the opposite side of said radially protruding portion of said socket-molding member from the radially protruding portion of said main body, further positioning bolts threaded through some of said threaded holes in said protruding portion of said socket-molding member and engaged with said annular member for fixing said annular member in position along said cylindrical portion, and further jack bolts threaded through the remainder of said theaded holes in said protruding portion of said socket-molding member with the forward ends of said further jack bolts abutting said annular member for, when said further positioning bolts have been disengaged from said annular member and said further jack bolts are threaded toward said annular member from said socket-molding member, separating said socket-molding member from said annular member and pulling said socket-molding member out of a plastic tubular body which has been molded around said mold.

8. A mold for molding a socket-type plastic tubular body, said mold comprising:

a main body having a tubular section and a radially protruding portion at one end thereof having a plurality of threaded holes therein;

a socket-molding member axially slidably mounted on said tubular section and having female threaded recesses therein;

positioning bolts extending through said threaded holes in said protruding portion and threadably engaged in said recesses;

means for fixing said positioning bolts relative to said protruding portion for fixing said socket-molding member at a predetermined position along said tubular section relative to said main body;

said socket-molding member having a cylindrical portion and a radially protruding portion protruding therefrom and having a plurality of threaded holes therein;

an annular member axially slidably mounted on said cylindrical portion and on the opposite side of said radially protruding portion of said socket-molding member from the radially protruding portion of said main body, further positioning bolts extending through said threaded holes in said protruding portion of said socket-molding member and engaged with said annular member, means for fixing said further positioning bolts relative to said protruding portion of said socket-molding member for fixing said annular member in position along said cylindrical portion; and jack bolts threadably mountable through said threaded holes in said protruding portion of said socket-molding member with the forward ends of said jack bolts abutting said annular member for, when said jack bolts are threaded toward said annular member from said socket-molding member, separating said socket-molding member from said annular member and pulling said main body and said socket-molding member out of a plastic tubular body which has been molded around said mold.

* * * * *